Oct. 23, 1956　　　C. L. POWELL　　　2,767,998
DIRIGIBLE WHEEL SUSPENSION MEANS
Filed Aug. 9, 1955　　　　　　　　　　3 Sheets-Sheet 1

INVENTOR
CHARLES L. POWELL

BY *Semmes & Semmes*
ATTORNEYS

INVENTOR
CHARLES L. POWELL

BY *Semmes & Semmes*
ATTORNEYS

INVENTOR
CHARLES L. POWELL

BY *Semmes & Semmes*
ATTORNEYS

United States Patent Office 2,767,998
Patented Oct. 23, 1956

2,767,998

DIRIGIBLE WHEEL SUSPENSION MEANS

Charles L. Powell, West Palm Beach, Fla.

Application August 9, 1955, Serial No. 527,264

9 Claims. (Cl. 280—96.2)

The present invention relates broadly to suspension means, and more specifically to movable suspension means for movably mounting and supporting a mechanism.

The present invention contemplates suspension means adapted for moving a mechanism or article rectilinearly in a positive manner, to prevent or eliminate compound directions of movement.

The present invention is particularly well adapted for mounting wheels on vehicles, such as automobiles, and especially front wheels of the vehicles which are independently mounted and individually movable up or down independent of movement of each other. In such independent front wheel suspension systems, heretofore utilized, it has not been possible to maintain the wheel planes straight during their path of movement, which has resulted in a transverse drag or scrubbing of the front wheels as they move up and down to accommodate the vehicle to the surface over which it is traveling.

The majority of independent front wheel suspension systems on modern day automobiles, utilize at least two arms having one end thereof affixed to a portion of the frame of the vehicle, and the outer free ends mounting therebetween the steering knuckle, spindle or spindle supporting mechanisms. Due to the fixed pivot points of these arms, and their fixed invariable length, when the wheel supported on the spindle moves up or down, and the arms pivot about their fixed pivot points, the wheel spindle will tend to move in an arc thereby causing the scrubbing or lateral drag on the wheel.

It is an object of the present invention to provide a suspension means of such a construction that mechanism supported thereby will always move in a rectilinear plane without lateral deviations or tendencies to move out of the rectilinear plane.

A further object of the present invention is to provide a suspension means of the nature described wherein a plurality of arms are provided for mounting and supporting the mechanism, and wherein the arms are provided with a sliding pivot point to compensate for their fixed length as they move through an arc, and whereby the outer extremities of the arms will always move in a rectilinear path or plane as they move upward or downward.

A still further object of the present invention is to provide suspension means for vehicle wheels or the like utilizing cam guides for the inner ends of the arms and sliding pivot points whereby the outer ends of the arms will move upward or downward in a rectilinear path at all times.

For the purpose of explaining the mechanism and operation of suspension means contemplated by the present invention, reference will be made to a suspension system for automobile wheels. It is to be understood that the invention is not limited to such use, but can be utilized any place where rectilinear movement of a mechanism or article is desired and wherein two or more arms are attached to the mechanism for suspension of the same.

Other and further objects and advantages of the present invention will be apparent from the following detailed description of embodiments of the invention when taken together with the accompanying drawings in which.

Figure 1:
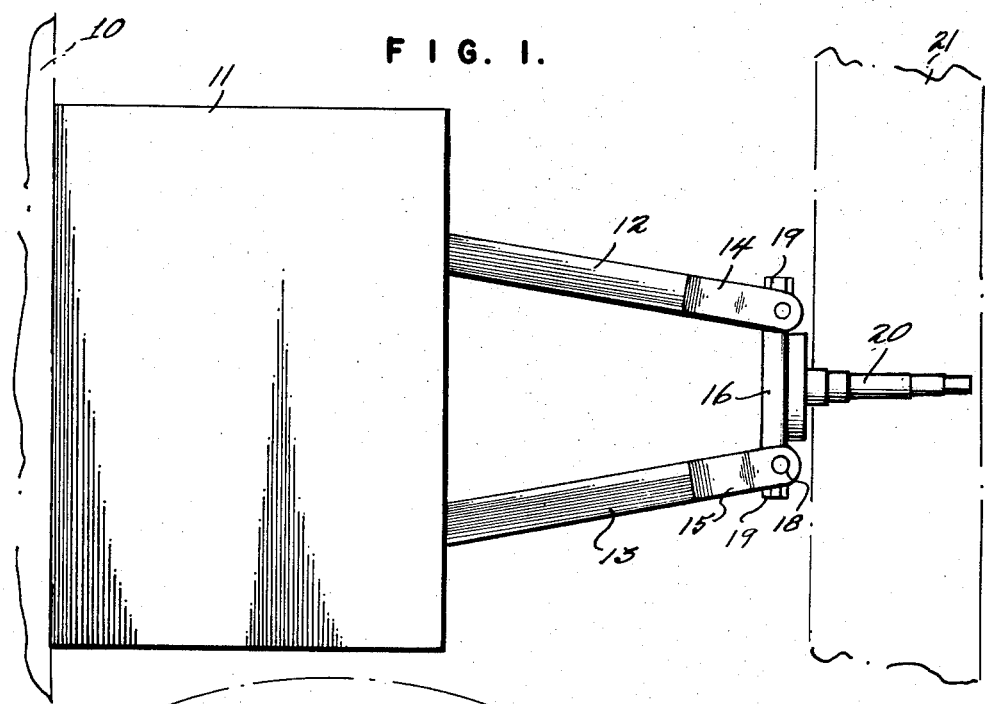
Fig. 1 is an elevational view of one form of a suspension system of the present invention.

In Fig. 1 of the drawings a portion of an automobile side frame member is fragmentarily shown in broken lines at 10. A casing 11 is provided which encloses a portion of the suspension device of the present invention, and is secured to the side frame 10 in any desired manner. An upper arm 12 and a lower arm 13 extend out of the casing 11. Yoke members 14 and 15 are attached to the outer ends of the arms 12 and 13, respectively. A vertical pin or steering knuckle 16 is rotatably mounted between the arms of the yokes by means of bearings, generally designated 17, mounted in the yokes by means of pins or bolts 18. The ends of the steering knuckle 16 have threaded caps or nuts 19 to hold it in position. The usual wheel spindle 20 is secured to the steering knuckle 16 and adapted for mounting thereon the usual wheel bearing and hub assembly. A fragment of a wheel is indicated in broken lines at 21.

Figure 2:
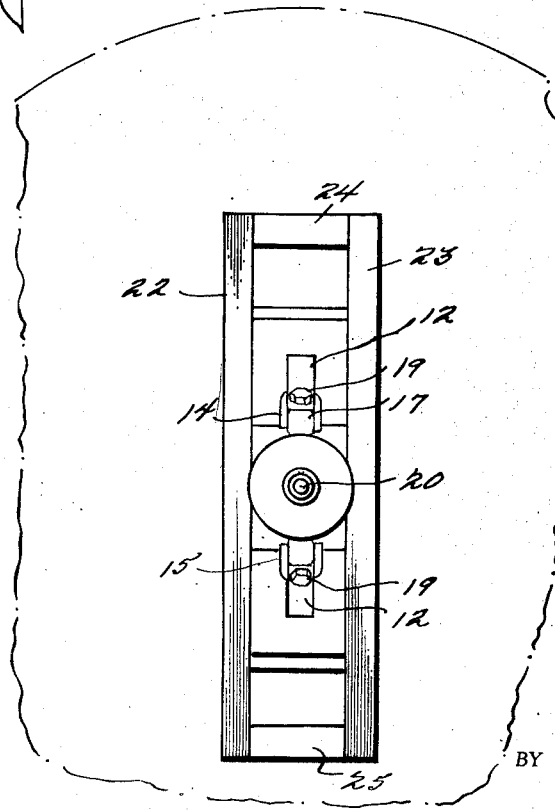
Fig. 2 is an end elevational view taken at right angles to Fig. 1.
Figure 3:
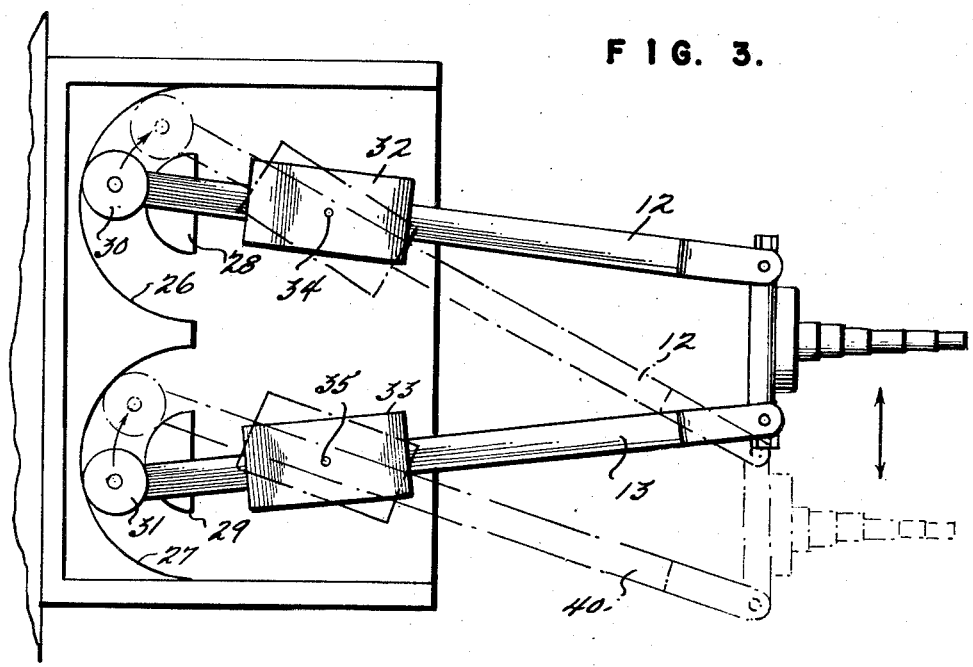
Fig. 3 is an elevational view corresponding to Fig. 1, but having a portion of the casing removed to show details of the mechanism.

As can be seen from Figs. 2 and 3 of the drawings, the casing 11 is of box-like construction, open at its outer end, and consisting of side members 22 and 23 with top and bottom transverse members 24 and 25. The casing is so designed that one of the side members 22 or 23 can be removed from the casing or, if desired, the transverse members 24 and 25 can be made in sections and respectively secured to different ones of the sides 22 and 23.

The casing 11 is provided at its inner end with two cam guides 26 and 27 of curved configuration. The curved surfaces are elliptical. Manifestly, the two guideways 26 and 27 can be made separate and of any desired material. In one form of the invention pairs of parallel cam guides are provided at spaced positions in the casing for the purpose of accommodating double rollers such as shown for example in Fig. 4.

Curved cam members 28 and 29 are secured in the casing in spaced relationship to the cam guides 26 and 27, respectively. The inner ends of the arms 12 and 13 are provided with rollers 30 and 31 of a size appropriate for movement in the guideways formed between the cam guides and cam members, as shown in Fig. 3. Where rollers are placed on either side of the arm such as at 30 and 30a in Fig. 4, the parallel sets of cam guides are used. This provides a more positive guiding action.

Figure 4:
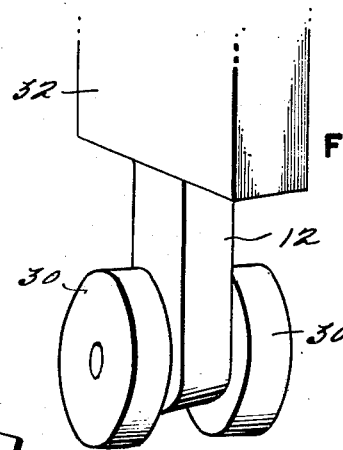
Fig. 4 is a fragmentary enlarged view of an inner end of a suspension arm showing roller means thereon.

Intermediate the ends of the arms 12 and 13, sliding pivot means are provided. In Figs. 3 and 4 the sliding pivot means consist of box members 32 and 33 mounted for pivotal movement between the sides 22 and 23 of casing 11, by means of pivots or the like 34 and 35. The ends of the boxes 32 and 33 are so dimensioned as to positively guide the arms 12 and 13 for relative displacement with respect to the boxes, and yet permit free sliding therethrough.

Figure 5:
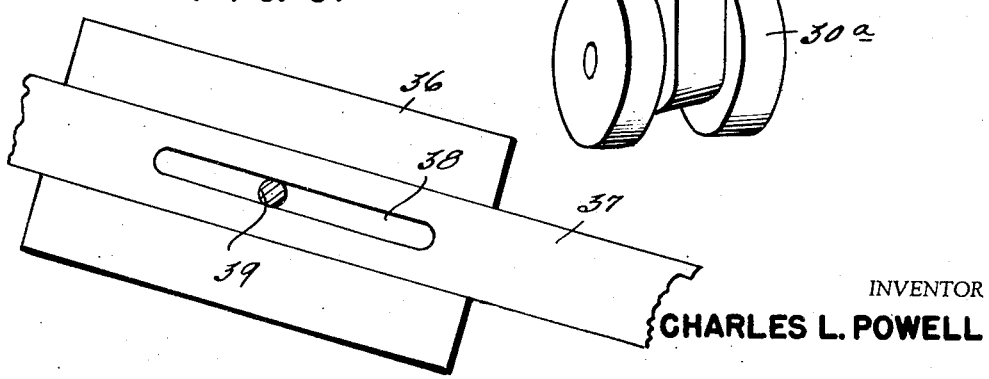
Fig. 5 is a fragmentary elevational view of one form of sliding pivot means for an arm.

One method by which the arms can be provided with a sliding pivot point is shown in Fig. 5 of the drawings, wherein, a support member 36 is provided and which might for example correspond to one side of a box, such as referred to above. The arm 37 has an elongated opening 38 therein. A pivot pin 39 is secured to the member 36 and passes through the opening 38 whereby the arm 37 is slidably and pivotally mounted.

By means of the mounting hereinbefore described, and consisting of the cam roller guides, with the sliding pivot points for the arms, the outer ends of the arms 12 and 13 will always move in a straight rectilinear path, and carry therewith the steering knuckle and wheel assembly in a rectilinear path. The movement of the arms, rollers, boxes, steering knuckle, and wheel or hub spindle is diagrammatically depicted in Fig. 3 wherein the limit of movement of the assembly in one position is generally shown at 40 in broken lines.

The distances from the pivot points of the arms to the back and front of the cam guides are dimensioned for a given range of upward and downward movement of the arms. The range of upward and downward movement of the arms is determined by the length of the arms and not its pivot point. Manifestly, slight deviations could be made in the cam or roller guides and the pivot points so as to vary the desired upward or downward limits of movement of the members supported by the arms.

In the embodiments shown in Figs. 1 to 3, inclusive, the arms 12 and 13 are angularly disposed with respect to one another. Additionally, they are mounted one over the other. It is possible, however, to have the arms parallel to each other or to have them mounted in side-by-side relationship and the same rectilinear motion can be obtained.

Figure 7:
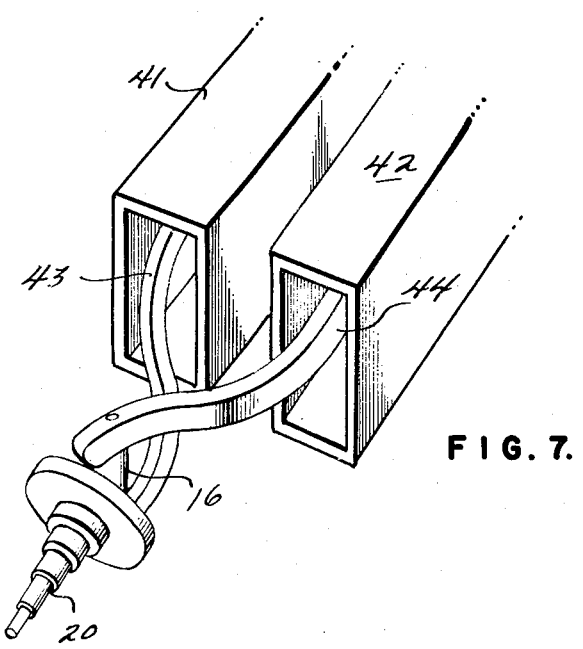
Fig. 7 is a perspective view of an additional embodiment of the invention.

In Fig. 7 of the drawings a side-by-side mounting of two arms is shown. In this view, boxes 41 and 42 are fragmentarily shown in spaced side-by-side and parallel relationship. Arms 43 and 44 are again mounted by means of sliding pivots in the same manner as the other embodiments described. The arms, however, are deformed or bent so that arm 43 is bent downward toward the bottom of the box then inwardly and then outwardly. The arm 44 is bent in a like manner and the box 42 is then reversed whereby the two deformed arms will be so arranged that the outer ends are directly above one another. The degree of bend or distance thereof are determined by the dimensions of the steering knuckles. The action of this form of the invention will be identical with the embodiment of Figs. 1 to 3, and a true rectilinear movement will always be provided for the steering knuckle 16 and spindle 20.

Figure 6:
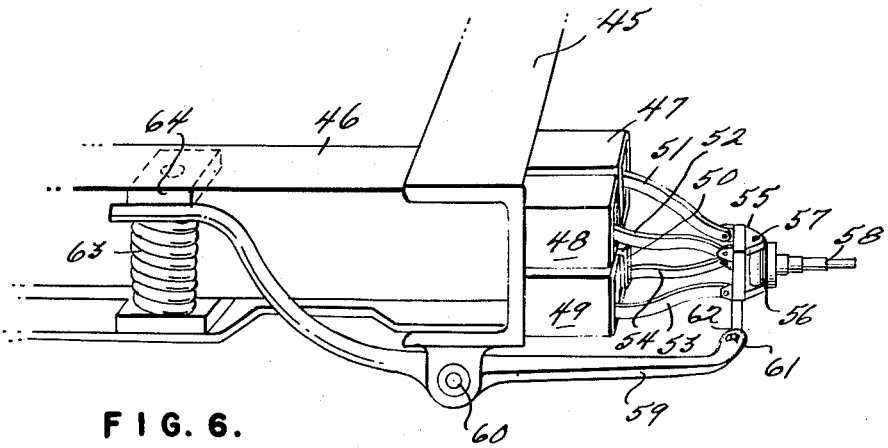
Fig. 6 is a perspective view showing another construction for mounting a vehicle wheel.

Fig. 6 of the drawing shows one typical assembly of a front wheel spring suspension system. A side frame member of a vehicle is shown at 45, and a cross-channel is depicted at 46, which can be bracing or any other type of member desired. Four boxes 47, 48, 49, and 50, are mounted on the frame in any desired manner and each of the boxes carries an arm which is mounted on a sliding pivot in the same manner as in the preceding forms. These arms are indicated respectively at 51, 52, 53, and 54. Each of these arms is so bent as to provide spaced sets of arms having their outer ends forming a rectangle on which is mounted a steering knuckle support 55, carrying a steering knuckle 56 by means of pivot 57, and carrying spindle 58 thereon. The steering knuckle 56 and the ends of the arms in this form of the invention will be able to move upwardly or downwardly but are confined to a rectilinear path of movement in the same manner as the other forms. A stabilizing arm 59 is pivotally mounted at 60, and at the outer end is provided with an arcuate slot 61. The member 55 carries at its lower end a pivot pin 62 which extends through the slot 61. A coil spring 63 is mounted in the channel by means of plates 64 or the like in the usual manner. The inner portion of the stabilizer arm 59 is so arranged as to pass between the spring 63 and plate 64. Upon movement of the steering knuckle 56 upwardly or downwardly, the arm 59 will be pivoted and by means of the spring and stabilizer arm, road shocks will be absorbed. Manifestly, shock absorber attachments can be utilized in conjunction with this invention as also suitable sway stabilizers. Details such as these are within the skill of those versed in the art, and are not required to be shown or described herein for an understanding of the invention.

The suspension means of the present invention can be utilized for many different purposes in order to provide a true rectilinear movement of a member supported thereby. It can be utilized, for example, on all four wheels of automobiles to eliminate tire drag or scrubbing as the body of the car moves upward and downward from road shocks. Various methods of mounting or arranging the arms can be effected. The boxes, for example, can be mounted in any desired manner and the size and shape of the arms can be varied so as to meet individual requirements. It is also possible, for example, to utilize a different number of arms such, for example, as three, wherein two are mounted in side-by-side relationship and a single arm mounted either above or below.

Manifestly, many other changes in the details of construction can be effected by those skilled in the art to which the invention pertains, without departing from the spirit and scope of the invention, as defined and limited only by the appended claims.

I claim:

1. Movable suspension means comprising an arm, means slidably and pivotally mounting said arm intermediate the ends thereof, means defining a symmetrical curvilinear guideway, means mounted on one end of said arm movably mounted and confined in said guideway for moving said end in a curved path upon pivoting of the arm and simultaneously sliding said arm with respect to said pivoting means, the free end of said arm moving in a rectilinear path.

2. Movable suspension means as claimed in claim 1, wherein said confined means comprise a roller rotatably mounted on said arm.

3. Movable suspension means as claimed in claim 2, said curved guideways being elliptical.

4. Movable suspension means comprising at least two spaced arms, means slidably pivoting each said arm intermediate the ends thereof, all said pivoting means being positioned in a common plane parallel to planes passing through the ends of said arms, guide means associated with one end of each said arm for moving said ends in identical curved paths upon pivoting of the arms and simultaneously sliding said arms with respect to said pivoting means whereby the free ends of said arms move rectilinearly in a common plane.

5. Movable suspension means as claimed in claim 4, and wherein four arms forming two pairs of upper and lower arms are positioned in side-by-side relationship.

6. Movable suspension means as claimed in claim 5, a bracket secured to the free ends of said arms, a steering knuckle pivotally mounted on said bracket and a hub spindle fixed to said steering knuckle.

7. Movable suspension means as claimed in claim 1, a box partially surrounding said arm and in slidable engagement therewith, said box being pivotally mounted and constituting said means slidably pivoting said arm.

8. Movable suspension means as claimed in claim 7, a casing partially surrounding said box and pivot means mounting said box in said casing for pivotal movement thereof.

9. Movable suspension means as claimed in claim 8, said arm having an elongated slot therethrough, said pivot means passing through said slot permitting pivotal sliding movement of said arm.

References Cited in the file of this patent

UNITED STATES PATENTS 2,094,824     Sanford _____ Oct. 5, 1937